United States Patent
Citriniti et al.

(10) Patent No.: US 12,111,230 B2
(45) Date of Patent: Oct. 8, 2024

(54) THERMAL GAS INSPECTION OF PLUGGED HONEYCOMB BODY

(71) Applicant: CORNING INCORPORATED, Corning, NY (US)

(72) Inventors: Joseph Henry Citriniti, Corning, NY (US); Seungcheol Yang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 531 days.

(21) Appl. No.: 17/434,071

(22) PCT Filed: Feb. 20, 2020

(86) PCT No.: PCT/US2020/018963
§ 371 (c)(1),
(2) Date: Aug. 26, 2021

(87) PCT Pub. No.: WO2020/185365
PCT Pub. Date: Sep. 17, 2020

(65) Prior Publication Data
US 2022/0136920 A1    May 5, 2022

Related U.S. Application Data

(60) Provisional application No. 62/818,315, filed on Mar. 14, 2019.

(51) Int. Cl.
*G01M 3/00* (2006.01)
*G01N 15/08* (2006.01)
*G01N 25/72* (2006.01)

(52) U.S. Cl.
CPC .......... *G01M 3/002* (2013.01); *G01N 15/082* (2013.01); *G01N 25/72* (2013.01); *G01N 2015/084* (2013.01)

(58) Field of Classification Search
None
See application file for complete search history.

(56) References Cited

U.S. PATENT DOCUMENTS 3,791,194 A    2/1974   Pontello
6,666,070 B1   12/2003  Hagg et al.
(Continued)

FOREIGN PATENT DOCUMENTS

CN    101796381 A    8/2010
CN    102132146 A    7/2011
(Continued)

OTHER PUBLICATIONS

Chinese Patent Application No. 202080021123.7, Office Action dated Aug. 25, 2023, 5 pages (English Translation only), Chinese Patent Office.
(Continued)

*Primary Examiner* — Erica S Lin
(74) *Attorney, Agent, or Firm* — Kevin M. Able

(57) ABSTRACT

Improved inspection techniques are described herein for identifying leaks in a plugged honeycomb body. The improved inspection techniques utilize a pore impediment and a test gas. The pore impediment is injected into the plugged honeycomb body, and the test gas is forced into the plugged honeycomb body. A thermal detector is used to collect thermal data from an inspection region of an outlet end of the plugged honeycomb body, and the thermal data is used to identify defects in the plugged honeycomb body.

20 Claims, 5 Drawing Sheets

(56) References Cited

U.S. PATENT DOCUMENTS

| | | |
|---|---|---|
| 7,043,964 B1 | 5/2006 | Hickman |
| 7,651,261 B2 | 1/2010 | Bunker et al. |
| 7,674,309 B2 | 3/2010 | Gargano et al. |
| 8,174,689 B2 | 5/2012 | Akao et al. |
| 8,287,183 B2 | 10/2012 | Shepard et al. |
| 9,067,831 B2 | 6/2015 | Chapman et al. |
| 2006/0068159 A1* | 3/2006 | Komori .................. C04B 35/63 428/116 |
| 2007/0238191 A1 | 10/2007 | Gargano et al. |
| 2008/0173071 A1* | 7/2008 | Park ................ G01N 21/95692 73/38 |
| 2008/0237428 A1* | 10/2008 | Kobayashi .......... C04B 35/6316 248/346.06 |
| 2010/0045975 A1 | 2/2010 | Zoeller, III |
| 2010/0201983 A1 | 8/2010 | Hatano et al. |
| 2010/0247224 A1 | 9/2010 | Chang |
| 2012/0247224 A1 | 10/2012 | Miyashita et al. |
| 2014/0147621 A1 | 5/2014 | Chapman et al. |
| 2015/0013435 A1 | 1/2015 | Sugiyama et al. |

FOREIGN PATENT DOCUMENTS

| | | |
|---|---|---|
| CN | 104280454 A | 1/2015 |
| CN | 105408731 A | 3/2016 |
| EP | 2233908 A2 | 9/2010 |
| JP | 09-145647 A | 6/1997 |
| JP | 2012-063349 A | 3/2012 |
| JP | 2012-083258 A | 4/2012 |
| JP | 5345422 B2 | 11/2013 |
| WO | 2012/124773 A1 | 9/2012 |
| WO | 2012/176889 A1 | 12/2012 |
| WO | 2017/061383 A1 | 4/2017 |

OTHER PUBLICATIONS

He et al., "Guided Image Filtering", in IEEE Transactions on Pattern Analysis and Machine Intelligence, vol. 35, No. 6, 2013, pp. 1397-1409.

Jain et al; "Machine Vision"; Academia, Chapter 5, 1995, pp. 157-161.

Sappok et al., "On-Board Particulate Filter Failure Prevention and Failure Diagnostics Using Radio Frequency Sensing", SAE Int. J. Engines, vol. 10, No. 4, 2017, 15 pages.

International Search Report and Written Opinion of the International Searching Authority, PCT/US2020/018963 Mailed on May 27, 2020, 12 pages; European Patent Office.

* cited by examiner

THERMAL GAS INSPECTION OF PLUGGED HONEYCOMB BODY

This is a national stage application under 35 U.S.C. § 371 of International Application No. PCT/US2020/018963, filed on Feb. 20, 2020, which claims the benefit of priority under 35 U.S.C. § 119 of U.S. Provisional Application No. 62/818,315 filed on Mar. 14, 2019, the content of which is incorporated herein by reference in its entirety.

BACKGROUND

Honeycomb bodies are used in a variety of applications, such as the construction of particulate filters and catalytic converters that treat unwanted components in a working fluid, such as pollutants in a combustion exhaust. Manufacture of honeycomb bodies may include inspection for inner wall defects, e.g., tears or holes in the walls of the honeycomb body, which could adversely impact performance of the honeycomb body.

SUMMARY

Various approaches are described herein for, among other things, providing improved inspection of a plugged honeycomb body. For instance, an apparatus to detect leaks in a plugged honeycomb body can be configured to improve the identification of defects in a plugged honeycomb body using a pore impediment and a test gas.

A first example apparatus to detect leaks in a plugged honeycomb body having a plurality of intersecting porous walls defining a first channel open at a first end of the honeycomb body and plugged at a second end opposite to the first end, and a second channel open at the second end and plugged at the first end comprises a pore impediment injector, a gas supply, a thermal detector, and one or more processors. The pore impediment injector is configured to inject a pore impediment into a plurality of pores of the intersecting porous walls of the plugged honeycomb body. The pore impediment has an impediment size that is smaller than a mean pore size of the plurality of pores. The gas supply is configured to force gas into an opening of the first channel at the first end of the plugged honeycomb body. The plugged honeycomb body is at a first temperature and the gas is at a second temperature that is different from the first temperature. The thermal detector is configured to collect thermal data from an inspection region of the second channel at the second end of the plugged honeycomb body. The one or more processors are configured to calculate gradient data related to at least one of a temperature change over time or a temperature difference over space from the thermal data.

A second example apparatus to detect leaks in a plugged honeycomb body having a plurality of intersecting porous walls defining a first channel open at a first end of the honeycomb body and plugged at a second end opposite to the first end, and a second channel open at the second end and plugged at the first end comprises a pore impediment injector, a gas supply, a thermal detector, and one or more processors. The pore impediment injector is configured to inject liquid that is provided as liquid droplets into a plurality of pores of the intersecting porous walls of the plugged honeycomb body. The liquid droplets are provided using at least one of nebulizing, atomizing, or spraying, and the liquid droplets have a mean droplet size that is smaller than a mean pore size of the plurality of pores. The gas supply is configured to force air into an opening of the first channel at the first end of the plugged honeycomb body. The plugged honeycomb body is at a first temperature and the air is at a second temperature that is different from the first temperature by at least 0.2° C. The thermal detector is configured to collect thermal data from an inspection region of the second channel at the second end of the plugged honeycomb body. The one or more processors are configured to calculate gradient data related to at least one of a temperature change over time or a temperature difference over space from the thermal data collected from the inspection region.

An example method of detecting leaks in a plugged honeycomb body having a plurality of intersecting porous walls defining a first channel open at a first end of the honeycomb body and plugged at a second end opposite to the first end, and a second channel open at the second end and plugged at the first end comprises injecting a pore impediment, forcing gas into an opening, collecting thermal data, and analyzing the thermal data. The pore impediment is injected into a plurality of pores of the intersecting porous walls of the plugged honeycomb body. The pore impediment has an impediment size that is smaller than a mean pore size of the plurality of pores. The gas is forced into an opening of the first channel defined by the plugged honeycomb body. The plugged honeycomb body is at a first temperature and the gas is at a second temperature that is different from the first temperature. Thermal data is collected from an inspection region of the second channel at the second end of the plugged honeycomb body using a thermal detector. The thermal data is analyzed to calculate gradient data related to at least one of a temperature change over time or a temperature difference over space of the inspection region to determine whether the plugged honeycomb body has one or more defects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
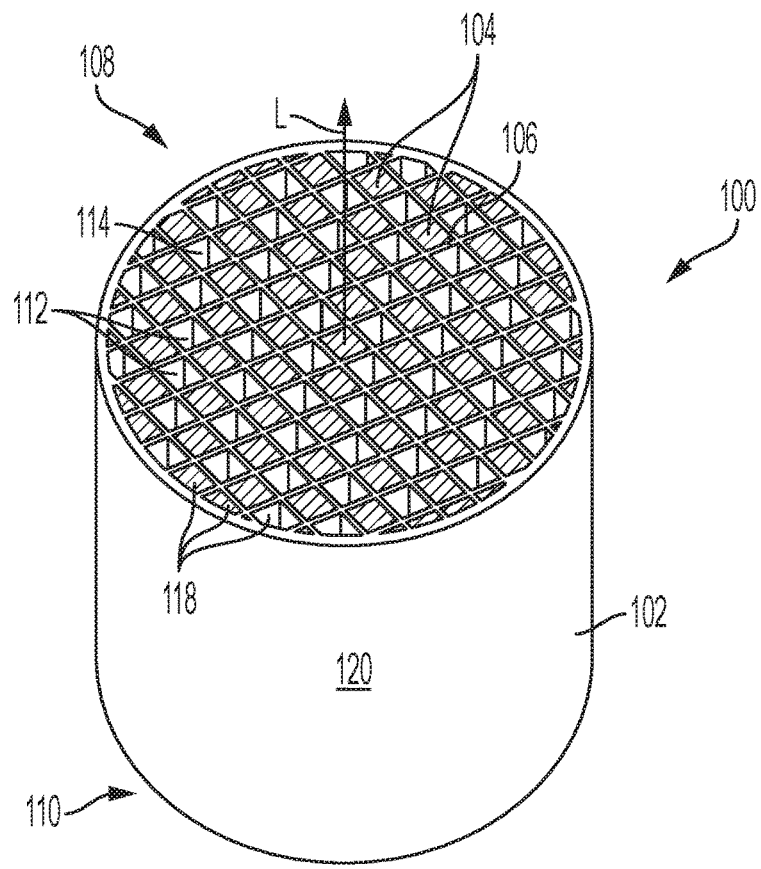
FIG. 1 is a perspective view of an example plugged honeycomb body.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein provide improvements over known inspection systems utilized for inspecting plugged honeycomb bodies. Example embodiments of an apparatus comprise a holder that supports the plugged honeycomb body, a pore impediment injector that injects a pore impediment into the plugged honeycomb body, a gas supply that forces a test gas into the channels of a plugged honeycomb body and a thermal detector that measures temperature response of the plugged honeycomb body at an outlet end. Exemplary methods generally comprise injecting a pore impediment into a plugged honeycomb body, forcing a test gas into the plugged honeycomb body, collecting thermal data at an outlet end of the plugged honeycomb body, analyzing the thermal data to determine whether the honeycomb body has any defects.

Initially, the plugged honeycomb body is at a first temperature that is different than a temperature of the test gas. The pore impediment at least partially fills the pores in the walls of the plugged honeycomb body, thereby at least partially blocking, impeding, hindering, or otherwise limiting the ability of the test gas molecules to flow through the porous walls of the plugged honeycomb body. In this way, the speed of travel of the test gas molecules through the porous walls can be slowed by the pore impediment and/or the test gas molecules are forced to undergo a relatively increased amount of heat transfer with the pore impediment as the test gas molecules pass through the honeycomb body. However, any tears, holes, or other defects in the walls of the honeycomb body, having a size greater than that of the pores, will not be as highly blocked by the pore impediment, thereby permitting the test gas molecules to flow through relatively unimpeded compared to test gas molecules flowing through the porous walls. For example, a flow of relatively hot test gas that is forced through the porous walls will be significantly cooled by the pore impediment in comparison to a flow of hot test gas that instead flows relatively unimpeded through a defect. In this way, the pore impediment increases the sensitivity to detect defects based on temperature differences at the exit of the channels of the honeycomb body. The improved sensitivity allows the system to determine a defect based on the temperature response in a short period of time.

Channels in the plugged honeycomb body that contain an internal defect show up as hot-spots (or cold spots, if a relatively colder test gas is utilized) in the thermal data because they allow the test gas to bypass the partially blocked porosity of the plugged honeycomb body. These channels are easily detectable because the temperature of the gas exiting those channels creates an increased thermal gradient of the outlet compared to non-defect channels in a short duration of time. In an example embodiment, the defect channels are identified within 10 seconds of injecting the test gas. In an example embodiment, a temperature gradient difference between a defect and a defect-free channel can be measured within 5 seconds of forcing test gas into the plugged honeycomb body after the pore impediment is injected.

The system provides increased sensitivity to small defects because the test gas flows more easily through defects, such as holes or tears, than the liquid droplets of the pore impediment due their comparative size. The system also provides high inspection throughput, for example, due to an ability to identify defects in a short amount of time, e.g., less than 10 seconds.

Figure 2:
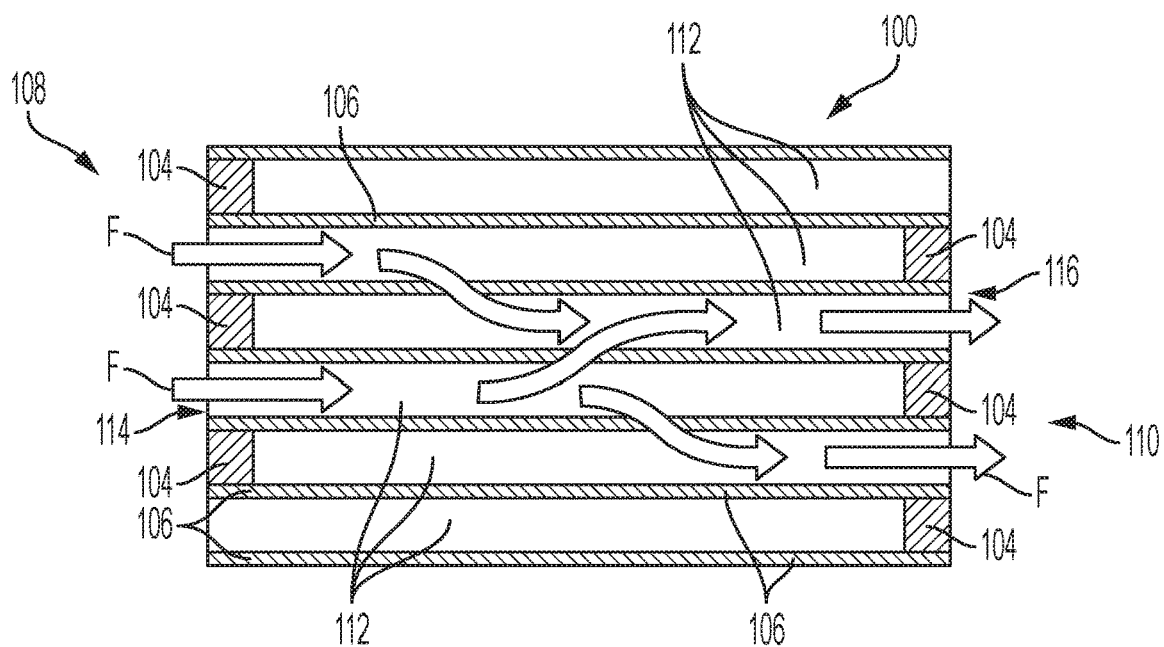
FIG. 2 is a side cross-sectional view of a portion of the plugged honeycomb body of FIG. 1.

FIGS. 1 and 2 illustrate an exemplary plugged honeycomb body 100. The plugged honeycomb body 100 is generally constructed from a honeycomb structure 102 and plugs 104. The porous honeycomb structure 102 can be formed in any desired manner, e.g., by extruding a ceramic-forming mixture through an extrusion die to form a green body, drying the green body, cutting the green body to length, and firing the green body to form a ceramic material. The honeycomb structure 102 comprises a plurality of spaced and intersecting inner walls 106 extending longitudinally through the porous honeycomb structure 102 from a first end 108 to a second end 110. The inner walls 106 combine to define a plurality of channels 112, or cells, extending through the honeycomb substrate 102 from the first end 108 to the second end 110 to form the cellular honeycomb construction of the honeycomb structure 102.

The honeycomb structure 102 can be constructed from at least one porous material having a predetermined mean pore size selected to block particulates carried in a gas of a working fluid (e.g., combustion exhaust or other fluid having filterable components) that is forced to flow through the pores. The honeycomb structure 102 is generally formed from an extruded ceramic material that is subsequently fired to form the open pores. In an example embodiment, the mean pore size is between 10-30 μm, and in another example embodiment about 20 μm.

The plugs 104 are positioned throughout the honeycomb structure 102 to form a labyrinth that defines a desired flow path F of the working fluid, shown in FIG. 2. The flow path F is configured to direct the working fluid flow through at least portions of the channels 112 and at least portions of the inner walls 106. The plugs 104 are installed in select channels 112 adjacent the first end 108, and in select channels 112 adjacent the second end 110 of the honeycomb structure 102 to form the plugged honeycomb body 100. For example, in some embodiments, at least some of the channels comprise the plugs 104 at the first end 108, but are unplugged at the second end 110, while others of the channels 112 comprise the plugs 104 at the second end 110, but are unplugged at the first end 108. In the illustrated example, the plugs 104 are located so that they generally form a checkerboard pattern in the first end 108 so that alternating channels are plugged. With respect to the illustrated embodiment, it is to be understood that an inverse of the checkerboard pattern would be plugged at the second end 110 (i.e., the channels open at the first end 108 are plugged at the second end 110 and vice-versa).

The porous honeycomb body 100 also comprises peripheral channels 118 that are generally partial cells that intersect an outer skin 120 of the plugged honeycomb body 100. The peripheral channels 118 can be plugged or unplugged as desired and/or in accordance with a selected design. The plugs 104 are configured so that working fluid is prevented from flowing past the plug 104, either between an adjacent inner wall 106 and the plug 104 or through the plug 104. As illustrated, the plugged honeycomb body 100 comprises channels having a square cross-sectional shape, but it should be understood that the channels can have other cross-sectional shapes, such as triangular, hexagonal, etc. Additionally, it is to be understood that any pattern of plugs 104 can be incorporated in the plugged honeycomb body 100, and it need not be limited to a checkerboard pattern. The plugged honeycomb body 100 defines a longitudinal axis L that extends from the first end 108 to the second end 110 that is substantially parallel to a longitudinal axis of a channel 112.

As described herein, the plugs 104 are located in some embodiments so that a channel 112 that is plugged at the first end 108 is not plugged at the second end 110, and a channel 112 that is not plugged at the first end 108 is plugged at the second end 110. In this configuration, the working fluid enters the plugged honeycomb body 100 via a first channel, e.g., a first channel 114, and exit the plugged honeycomb body 100 via a second channel, e.g., a second channel 116, after passing through pores in an inner wall 106 separating the first channel 114 from the second channel 116. This configuration is one example of the first channel 114 being fluidly coupled to, or in fluid communication with, the second channel 116 via the pores in the inner wall 106. As a result, the working fluid is able to flow from the first channel 114 to the second channel 116. It should be appreciated that each of the channels 112 can be fluidly coupled to a plurality of adjacent channels 112.

Figure 3:
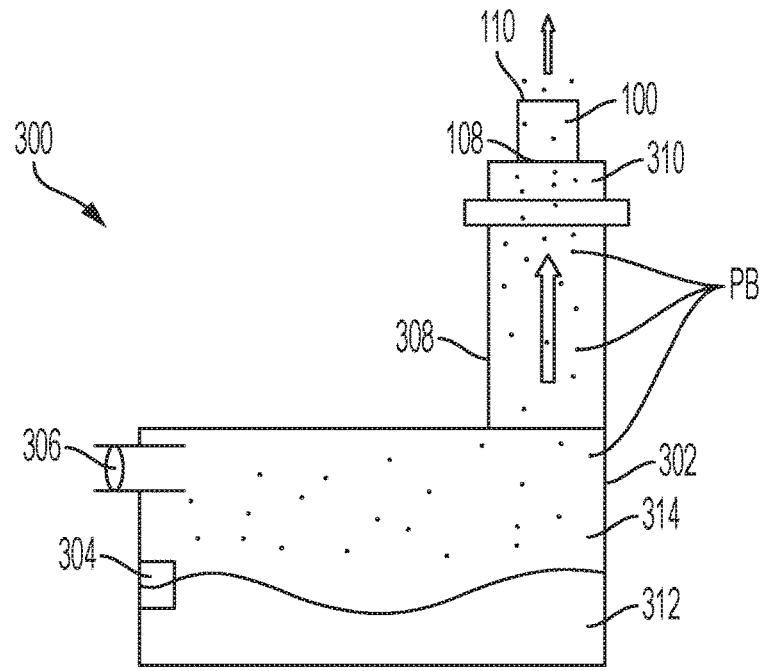
FIG. 3 is a side view of an example pore blocker apparatus for applying a pore impediment to a plugged honeycomb body in accordance with an embodiment.

Referring to FIG. 3, an example pore impediment injector 300 will be described. Generally, in the illustrated embodiment, the impediment injector 300 is used to wet the internal walls of the plugged honeycomb body 100 with a pore impediment prior to testing with a thermal test gas. In an example embodiment, the impediment injector 300 is a priming device that injects pore impediment into the plugged honeycomb body 100. In some embodiments, the pore impediment is injected (e.g., applied to the walls of the plugged honeycomb body 100) as a mist or spray of suspended droplets of the pore impediment. For example, a material used to form the pore impediment, such as a liquid, is converted to droplets suspended in a gas and injected into the plugged honeycomb body 100 by the impediment injector 300. The pores of the plugged honeycomb body 100 capture the droplets, which at least partially fill the pores in the walls of the plugged honeycomb body 100 so that the fluid communication between adjacent channels 112 is at least partially blocked by the pore impediment. It is to be appreciated that the pore impediment can be applied in a manner other than in the form of droplets, but that the use of droplets enables the saturation level to be more accurately controlled. By controlling the saturation level, the pores can be blocked without impeding flow through the defects. For example, the honeycomb body 100 can be submerged in a bulk of the pore impediment material, or the pore impediment material can be poured over the honeycomb body 100, but this may oversaturate the honeycomb body 100, that is, fill and block both the pores and the defects with the pore impediment.

In some embodiments, the impediment injector 300 comprises a storage vessel 302, a droplet generator 304, a fan 306, a conduit 308, and a holder 310 for the honeycomb body 100. The storage vessel 302 is a container that houses the material that forms the pore impediment in bulk (e.g., before droplets are made). The storage vessel 302 can comprise multiple compartments or portions. In one embodiment, the storage vessel 302 comprises a first portion 312 that houses the liquid pore impediment material, and a second portion 314 that houses pore impediment droplets PB suspended in a gas, such as air. The storage vessel 302 can also house the droplet generator 304 that creates the pore impediment droplets PB.

The droplet generator 304 converts the liquid pore impediment material into droplets. The droplets are dispersed in the gas by the droplet generator 304 so that a flow of the suspended pore impediment droplets PB can be formed. Various mechanisms can be utilized to generate suspended liquid droplets, such as ultrasonic disks, spray nozzles, and heating elements to induce boiling. When injected into the plugged honeycomb body 100, the pore impediment droplets PB formed by the droplet generator 304 at least partially block the pores included in the inner walls 106 of the plugged honeycomb body 100.

The fan 306 can be used to create a pressure differential to inject the suspended pore impediment droplets PB, e.g., by blowing the droplets from the impediment injector 300 and into the plugged honeycomb body 100. For instance, the resulting pressure can exceed 30 Pa above ambient pressure. As a further example, the fan 306 can be used to create a pressure head above ambient pressure that is in a range from 30 Pa to 70 Pa, which provides suitable injection of water droplets into porous ceramic walls as described herein. However, other pressures can be useful depending on various factors, such as the material of the pore impediment, the size of the droplets, the size of the pores, etc. In another example, a pressurized gas source can be coupled to storage vessel 302 to create the pressure differential and flow of the pore impediment droplets PB. The conduit 308 extends between the storage vessel 302 and the holder 310, and the pressure differential forces the pore impediment droplets PB to flow through the conduit 308 toward the plugged honeycomb body 100 that is coupled to the holder 310.

The impediment injector 300 can comprise the holder 310 as a fixture that is coupled to the conduit 308, opposite the storage vessel 302. The holder 310 can be used to position the plugged honeycomb body 100 relative to the conduit 308 so that the pore impediment droplets PB can be injected into the plugged honeycomb body 100. The holder 310 can be arranged to facilitate injection of the pore impediment into the honeycomb body. For example, in some embodiments the holder 310 comprises a bladder, o-ring, or other sealing device that seals around the outer perimeter of the plugged honeycomb body 100 on outer skin 120. In this way, the holder 310 seals on the plugged honeycomb body 100 by circumscribing and contacting the outer skin 120 of the plugged honeycomb body 100. In some embodiments, the holder 310 creates a hermetic seal with the plugged honeycomb body 100. The seal secures against the outer skin 120 of the plugged honeycomb body 100 so that the pore impediment droplets PB are injected into and through the porous walls of the plugged honeycomb body 100 and are prevented from flowing past the perimeter of the plugged honeycomb body 100.

The pore impediment droplets PB are sized relative to the pores of the inner walls 106 of the plugged honeycomb body 100. The size is selected to provide a predetermined, desired, or target amount of blockage in the porosity of the inner walls 106. In some embodiments, the pore impediment droplets are sized to be 5-80% of the mean pore size of the pores of inner walls 106. In this way, the droplets are able to at least partially fill the pores, as well as travel between pores, which are often connected in a tortuous flow path having restrictions (e.g., pore necks between connected pores) that are smaller in dimension than the mean pore size. Several properties of water aid in its use as a pore impediment. For example, water is not particularly viscous, so it can be injected at relatively lower pressures and/or at relatively larger droplet sizes than more viscous materials, and it is generally non-reactive with respect to ceramic materials from which the honeycomb body 100 can be created. Additionally, the cohesion properties of water enable multiple droplets (e.g., smaller droplet sizes) to pool together within the pores of the walls to block a larger volume of the pores.

In an example embodiment, the pore impediment droplets, e.g., water droplets, can be sized in a range of 500 nm-24 μm, for an example embodiment of a plugged honeycomb body 100 having pores having mean pore size of 10-30 μm. In an example embodiment, the pore impediment droplets PB, e.g., water droplets, can be sized in a range of 1-10 μm. However, it is to be appreciated that the size of the pore impediment droplets can be set or selected in accordance with any number of factors, such as the material of the pore impediment (e.g., pore impediment materials having higher cohesion enabling potentially smaller droplets to be used, pore impediment materials having lower viscosity enabling potentially lower injection pressures, etc.), pressure differential under which the pore impediment is injected (e.g., high pressures enabling higher viscosity pore impediment materials, larger droplet sizes, etc.), porosity of the walls (e.g., higher porosities at similar mean pore size indicating a larger volume that can be blocked by the pore impediment, thereby potentially benefitting from larger droplet sizes), etc.

As discussed herein, the impediment injector 300 can be used to inject the pore impediment into the plugged honeycomb body 100 until the plugged honeycomb body 100 has a predetermined amount of saturation by the pore impediment. In an example embodiment, the pore impediment is injected into the plugged honeycomb body 100 for a predetermined amount of time, such as 1-3 minutes, and in an example embodiment for 1 minute. In another example, the plugged honeycomb body 100 can be weighed before injecting the pore impediment and weighed after injecting the pore impediment to determine an amount of saturation.

As discussed above, the saturation level can be selected such that the pore impediment blocks pores without also unduly impeding flow through the defects, which could make the defects less identifiable. Suitable saturation levels for any given body size and type can be tested experimentally by subjecting one or more honeycomb bodies with known defects (e.g., size and location, such as intentionally formed in the honeycomb and/or verified by X-ray or other inspection means) at different saturation levels to a variety of different inspection conditions. Factors that affect the suitable saturation level for a particular honeycomb body include, but are not limited to, the porosity of the honeycomb body (e.g., more porous bodies capable of being saturated to a higher degree), size of the honeycomb body such as diameter and length (e.g., larger bodies being capable of being saturated to a higher degree), etc., as well as parameters of pore impediment injector, such as air flow rate, concentration of pore impediment in the gas carrier, etc.

The saturation level (e.g., as a function of the amount of time the pore impediment is injected under a given pressure at a given droplet size and concentration) can be experimentally determined by applying pore impediment to a test sample having known defects and determining the effectiveness of the thermal test to identify defects under different saturation levels. The time, pressure, material, and temperature of the pore impediment injection, the gas carrying the pore impediment material, the flow rate or concentration of the suspended pore impediment (e.g., ratio of pore impediment to carrier gas), and/or the properties plugged honeycomb body 100 (e.g., mean pore size, porosity, etc.) can be considered when determining the effectiveness of a saturation.

The pore impediment can be formed from one of nebulized, atomized, or sprayed liquid to form the suspended pore impediment droplets. In an example embodiment, the pore impediment material is water, such as distilled or reverse-osmosis filtered water suspended in air. In an example embodiment, the pore impediment is a glycol-based liquid, although other liquids can also be used. Similarly, nitrogen or gases, such as generally inert gases, can be utilized to carry suspended droplets of the pore impediment material.

Figure 4:
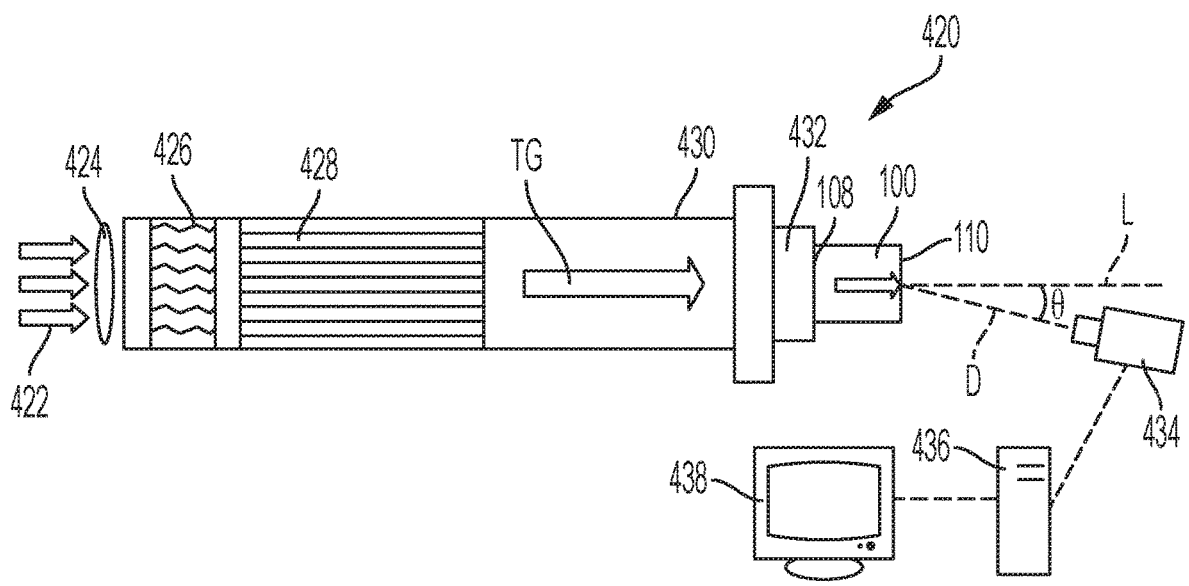
FIG. 4 is a side view of an example apparatus to detect leaks in a plugged honeycomb body in accordance with an embodiment.

Referring now to FIG. 4, an example test gas supply apparatus 420 that provides test gas TG for testing the plugged honeycomb body 100 will be described. The test gas TG is depicted in the Figures as dots generally representative of relative molecule size, i.e., having smaller molecules than the size of the pores and/or of the pore impediment in the pores. A plugged honeycomb body 100 saturated with pore impediment is provided at a first temperature and the test gas supply apparatus 420 is used to force a test gas having a second temperature into the plugged honeycomb body 100. For example, the test gas supply apparatus 420 is configured to force gas at a temperature different than the plugged honeycomb body 100 into a first end the plugged honeycomb body 100 to allow identification of defects in inner walls 106 of the plugged honeycomb body 100 based on thermal differences or gradients measured at a second end of the plugged honeycomb body 100 opposite to the first end. In some embodiments, the first temperature is approximately room temperature. In some embodiments, the second temperature is greater (hotter) than the first temperature. In some embodiments, the second temperature is lower (colder) than the first temperature.

In some embodiments, the test gas supply apparatus 420 comprises a gas source 422, a fan 424, a heating element 426, a flow straightener 428, a conduit 430, a holder 432, a thermal detector 434, at least one processor 436, and/or a display 438. The gas source 422 provides test gas TG that is conditioned in the test gas supply apparatus 420 and forced into the plugged honeycomb body 100 for testing. The test gas TG can be any suitable gas. The gas source 422 can be a contained source of test gas TG, such as bottles or vessels containing a selected test gas TG. In an example embodiment, the test gas TG source is ambient air. Examples of test gas include but are not limited to air, nitrogen, hydrogen, and helium.

The test gas supply apparatus 420 can comprise the fan 424 to force test gas TG through the apparatus and into the plugged honeycomb body 100. For example, the fan 424 forces the test gas TG past the heating element 426 and the flow straightener 428. In an example embodiment, the gas source 422 is a pressurized gas source and no fan is required. For instance, the gas source 422 can comprise pressurized bottles of test gas TG.

If the second temperature of the test gas is to be greater than the first temperature of the honeycomb body 100, the test gas supply apparatus 420 can comprise at least one heating element 426 used to condition the test gas TG so that the test gas TG is at a temperature different than the first temperature. Any measurable temperature difference can be used between the first and second temperatures. In one example embodiment, a difference between the first temperature and the second temperature is at least 0.2° C. and/or results in a temperature gradient at the monitored end of the honeycomb body 100 of at least 0.2° C. for channels in which a defect is present. In a second example embodiment, the difference is at least 10° C. and/or results in a temperature gradient at the monitored end of the honeycomb body 100 of at least 10° C. for channels in which a defect is present. The heating element 426 can take any form, such as a resistive heating element. It is to be appreciated that the test gas TG can be at a temperature greater than or less than the temperature of the plugged honeycomb body 100. It is to be appreciated that other temperatures can be utilized as long as the temperature difference can be identified at the monitored end of the honeycomb body 100. For example, a temperature difference that is too small can result in the second temperature test gas TG changing to be the same as the first temperature of the honeycomb body 100 by the time the test gas TG exits the honeycomb body 100.

The flow straightener 428 can be comprised by the test gas supply apparatus 420 to provide a uniform flow of the test gas TG. The flow straightener 428 can comprise a plurality of parallel conduits through which the test gas TG is forced to flow to provide a uniform flow velocity of the test gas TG across the conduit 430 that extends between the flow straightener 428 and the holder 432. For example, a uniform flow velocity of the test gas TG results in the test gas being forced into the plugged honeycomb body 100 with a more uniform pressure across the end face of the plugged honeycomb body 100.

The holder 432 can be coupled to the conduit 430 opposite the gas source 422 in order to support the plugged honeycomb body 100 adjacent an opening of the conduit 430. The holder 432 can be used in conjunction with the flow straightener 428 and configured to align the plugged honeycomb body 100 so that the longitudinal axis of the plugged honeycomb body is substantially parallel to the direction of flow of the test gas TG exiting the flow straightener 428. In the illustrated embodiment, the plugged honeycomb body 100 is oriented so that the first end 108 is closest to conduit 430 with the channels 112 opened to the first end 108 providing entrances for the test gas TG. In that configuration, the second end 110 forms an outlet, or exit, end to enable the test gas TG to flow through the plugged honeycomb body 100. Additionally, the holder 432 can be configured to support the plugged honeycomb body 100 so that the plugged honeycomb body 100 is spaced from the side walls of the conduit 430 so that a central region of the flow of the test gas TG is forced into the plugged honeycomb body 100 to avoid uneven flow effects (e.g., boundary layer effects) caused by interaction between the test gas TG and the wall of the conduit 430.

The holder 432 can also comprise a bladder, such as an inflatable bladder, that circumscribes and seals with the outer skin 120 of the plugged honeycomb body 100. For example, the bladder can be configured to create a hermetic seal with the outer surface 120 of plugged honeycomb body so that the test gas is forced to flow into the plugged honeycomb body 100 and is inhibited (e.g., prevented) from flowing past the perimeter of the plugged honeycomb body 100. In an example embodiment, the test gas that is forced into the plugged honeycomb body 100 has a relative humidity in a range of 2-50%, e.g., similar to ambient air. In some embodiments, a more humid air can be utilized, e.g., to delay the time in which the pore impediment (such as water) is evaporated and thereby removed from the pores.

The thermal detector 434 is configured to collect thermal data from an inspection region of at least one wall of the plugged honeycomb body 100. In particular, the thermal detector 434 is, or comprises, a sensor used to monitor the temperature, such as via infrared radiation, of the channel walls on the outlet side of the plugged honeycomb body 100. The thermal detector 434 defines a detection axis D that is directed at the plugged honeycomb body 100 to collect the thermal data. In some embodiments, the detection axis D is oriented so that the thermal detector 434 monitors the temperature of the walls of the channels 112 proximate to the end 110 of the honeycomb body 100. In this way, the thermal detector 434 can be oriented so that the detection axis D and the longitudinal axis L of the plugged honeycomb body 100 (and of the channels 112) form an angle $\theta$. In some embodiments, the angle $\theta$ is in a range between about 1-90°. In some embodiments, the angle $\theta$ is in a range between about 1-30,° and in some embodiments the angle $\theta$ is in a range between about 10-20°. The angle $\theta$ between the detection axis D and the longitudinal axis L of the plugged honeycomb body 100 and the exit channel 112 can be used to more accurately target the inspection region and thereby prevent the thermal detector 434 from capturing infrared radiation emanating from other locations, e.g., the plugs 104 adjacent the first end 108 of the plugged honeycomb body 100, and giving false positives during inspection.

The temperature of the plugged honeycomb body 100 (e.g., the amount of infrared radiation generated) changes over time with the injection of the test gas TG into the plugged honeycomb body 100 due to the temperature difference between the test gas TG and the plugged honeycomb body 100. Infrared radiation can be measured using a long-wave infrared radiation camera, such as a forward looking (FLIR) thermal imaging camera. The camera can detect radiation coming from a portion of the wall of the plugged honeycomb body 100 using a sensor that detects radiation defined by a wavelength in a range from about 7 µm to about 14 µm. In an example embodiment, the thermal detector 434 provides a field of view that encompasses the entire second end 110 of the plugged honeycomb body 100 so that thermal data across the plugged honeycomb body 100 is collected.

The processor 436 is configured to calculate gradient data from the thermal data collected by the thermal detector 434. Calculating the gradient data can comprise calculating a change in temperature over time for each pixel captured by the thermal detector 434. The gradient data can be compared to a predetermined gradient threshold to identify any of the channels 112 that comprise internal defects. In an example embodiment, the processor 436 calculates gradient data related to temperature differences over space based on the thermal data. The processor 436 can also be configured to output gradient and/or temperature data to create a visual display for an operator.

Figure 6A:
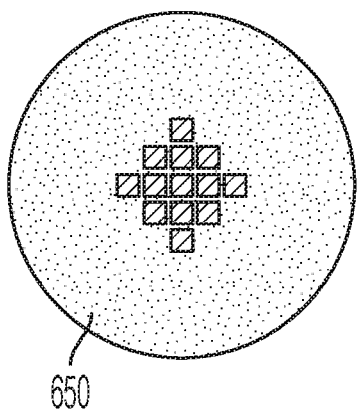
FIGS. 6A-6C are examples of thermal images of a portion of a plugged honeycomb body taken by a thermal detector to detect leaks in the plugged honeycomb body in accordance with an embodiment.
Figure 6B:
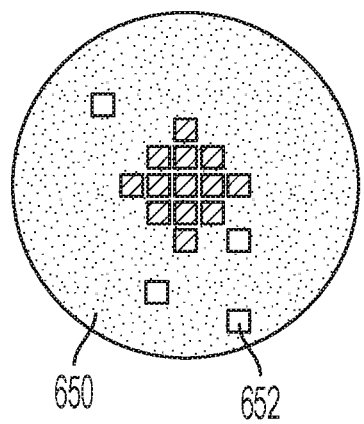
Figure 6C:
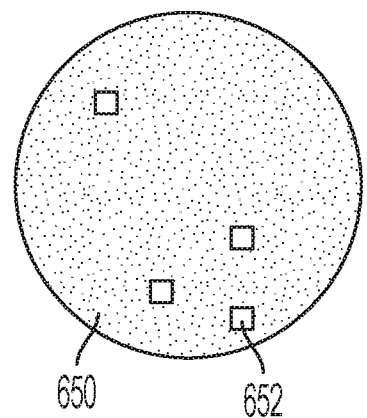

The display 438 can be used to provide a visual representation of gradient data calculated by the processor 436 and/or temperature data collected by the thermal detector 434 (e.g., as discussed with respect to FIGS. 6A-6C). In an example embodiment, the display 438 is a monitor that forms a display based at least in part on the output generated by the processor 436.

Figure 5:
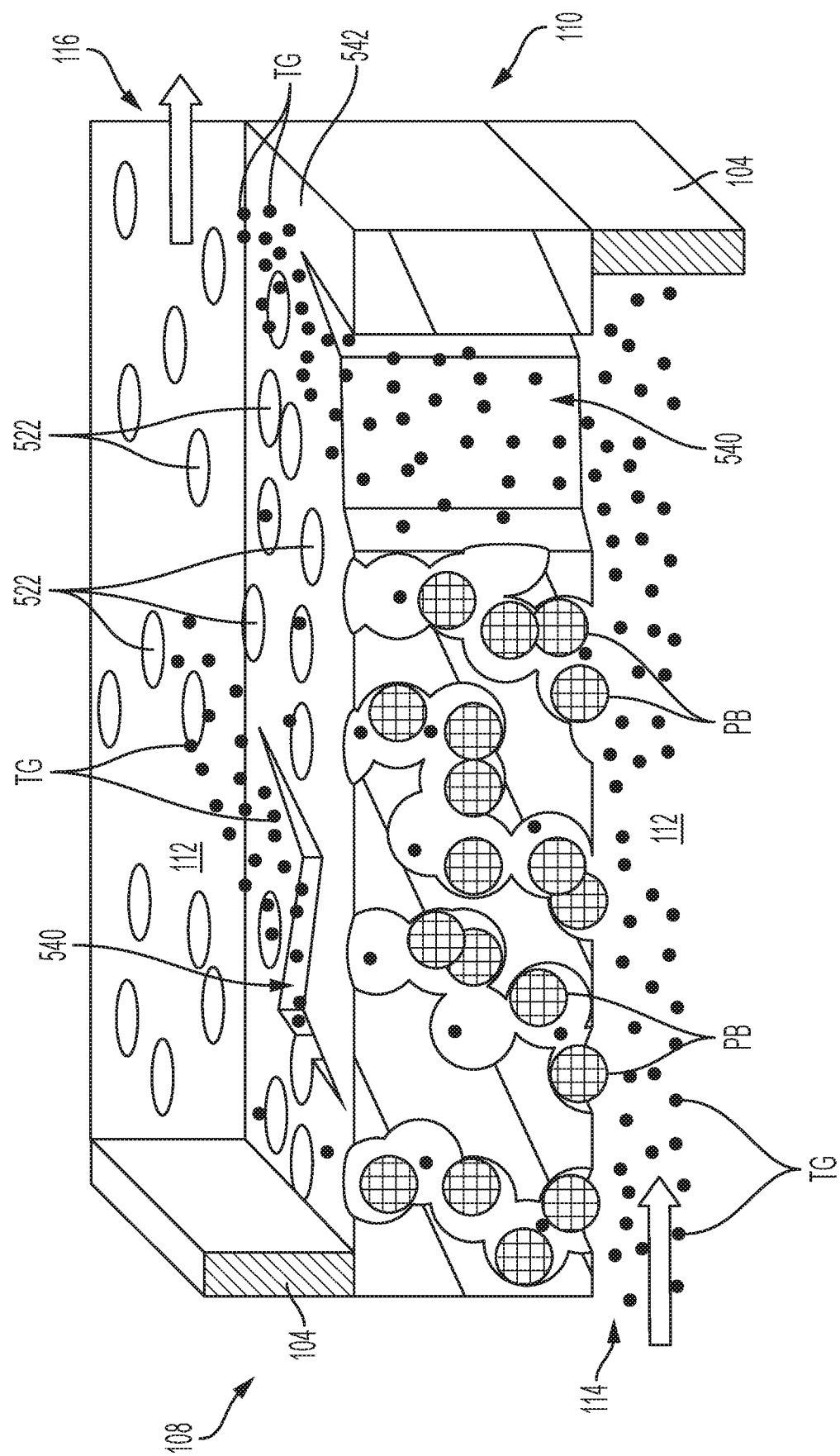
FIG. 5 is a side cross-sectional view of a portion of an example plugged honeycomb body when applying a method of detecting leaks therein in accordance with an embodiment.

Referring to FIG. 5, a portion of an example of the plugged honeycomb body 100 will be described. In particular, a portion of the plugged honeycomb body 100 during thermal testing according to an example scenario is illustrated. The plugged honeycomb body 100 is illustrated comprising pore impediment droplets PB disposed in pores 522 of the inner walls 106 of the plugged honeycomb body 100, and a plurality of defects 540 (e.g., cracks, tears, or holes in the walls 106). The size of the pore impediment droplets PB is selected so that the droplets at least partially fill the pores 522 while being significantly smaller than anomalies in the inner wall 106 considered to be defects. As a result, the pore impediment particles PB effectively reduce the amount of test gas TG that is able to flow through the pores 522, while having little effect on the ability of the test gas TG to flow through the defects 540. Accordingly, a higher volume of test gas can pass through the defect, effectively creating a "short-circuit" through the inner wall 106. That is, instead of traveling through the tortuous path created by the pores of the walls 106, the test gas TG instead travels more directly through the defect(s) 540. Inner walls 106 that are free of defects are sufficiently blocked by the pore impediment droplets PB to significantly limit and slow the flow of the test gas TG so that the test gas TG in defect-free channels undergoes a greater amount of heat exchange with the walls 106 and the pore impediment PB. By instead more directly traveling through the "short-circuit" provided by defects 540, the test gas TG in defect-containing channels will exit the honeycomb body 100 at a temperature that more closely resembles the initial temperature of the test gas TG. In this way, a greater temperature differential will be measured between channels including defects 540 and those that are defect free. Additionally, the temperature differential for defect-containing channels will become apparent in a short amount of time, since a significant volume of the test gas TG takes the more direct "short-circuit" path provided by the defects 540.

The ability of a high volume of test gas TG to flow through the defects 540 (relative to the flow rate through the porous walls 106) creates a large temperature gradient at the outlet of the second channel 116 of the plugged honeycomb body 100 in a relatively short period of time allowing defects to be identified relatively quickly. For example, the temperature gradient can be identified in approximately however long it takes for the test gas TG to flow from the end 108 of the honeycomb body 100 to heat the walls 106 at the opposite end 110, e.g., on the order of several seconds. The temperature gradient also creates a spatial gradient, i.e., difference in temperature over space, between adjacent cells in a short amount of time. A portion of the walls 106 of the channels 112 comprising outlets (i.e., are unplugged or open) at the second end 110 (e.g., the channel 116) forms an inspection region 542 that is used to measure a temperature gradient. For example, radiation emanating from each of the inspection regions 542 can be measured (e.g., by the thermal detector 434) to provide thermal data during inspection that can be used to determine a temperature and/or temperature gradient at each of the outlets.

Referring to FIGS. 6A-6C, example thermal images formed from the thermal data collected by the thermal detector 434 will be described. The images illustrate an example embodiment of a technique that can be applied by the processor 436 to provide an image that can be used, e.g., by the processor, to identify any defects 540 in the plugged honeycomb body 100. FIG. 6A shows an initial state just before the test gas TG is flowed into the plugged honeycomb body 100. In the initial state, the plugged honeycomb body 100 is generally at the first temperature uniformly across the body. In some instances, the plugged honeycomb body 100 can include portions having small temperature deviations from the first temperature, such as the cross-hatched channels 650 illustrated in the central portion of FIG. 6A. For example, the blackened portions of FIG. 6A can correspond to a coldest temperature and the cross-hatched channels 650 can correspond to channels that are slightly warmer than the coldest temperature. The image of the plugged honeycomb body 100 in the initial state can be used as a baseline for processing the thermal data and creating a visual display.

FIG. 6B shows the plugged honeycomb body 100 after a designated amount of time (e.g., a few seconds) of the test gas TG flowing into the plugged honeycomb body 100, such as at 3-10 seconds. As shown in the illustration, a plurality of channels are shown as bright spots (due to the temperature difference), thereby corresponding to defective channels 652. It is to be appreciated that a "bright spot" as used herein can comprise any difference in appearance that designates a difference in temperature. For example, relatively hotter regions can be displayed as a first color, e.g., red, and relatively colder sections in a second color, e.g., blue or green. As another example, a "bright spot" can alternatively be shown as a relatively darker area, as opposed to a relatively brighter area. In addition, the channels having an initial temperature deviating from the first temperature are included in the image and shown as cross-hatched channels 650.

FIG. 6C shows a normalized temperature image that utilizes an image processing technique of flattening to exaggerate the signal corresponding to a defect. For example, the initial image of FIG. 6A is used to normalize the image of FIG. 6B to provide more detail for creating a digital display, such as by subtracting the thermal data shown in FIG. 6A from the thermal data shown in FIG. 6B. In an example embodiment, the subtraction of the initial thermal data from the subsequent image may result in the bright spots corresponding to defective channels displaying brighter to provide greater contrast. In this way, it is to be appreciated that any temperature gradient already present between cells in the initial state (e.g., between the cross-hatched channels 650 and the rest of the channels in FIG. 6A) will be corrected for and not identified as defect-containing channels after normalizing. In an example embodiment, the baseline image is subtracted from every subsequent image.

Because channels having internal defects are heated (or cooled if a colder temperature test gas is used) relatively quickly in comparison to defect-free channels, pixels of the thermal detector that collect thermal data from defect channels have a first appearance (e.g., a first color, a relatively high intensity, a relatively low intensity, etc.) in the thermal image (e.g., form bright spots). The bright spots in the images illustrate temperatures, or temperature change over time. In an example embodiment, the bright spots in the image can also be bright regions demonstrating temperature difference over space, such as a difference in temperature over a predefined area.

Figure 7:
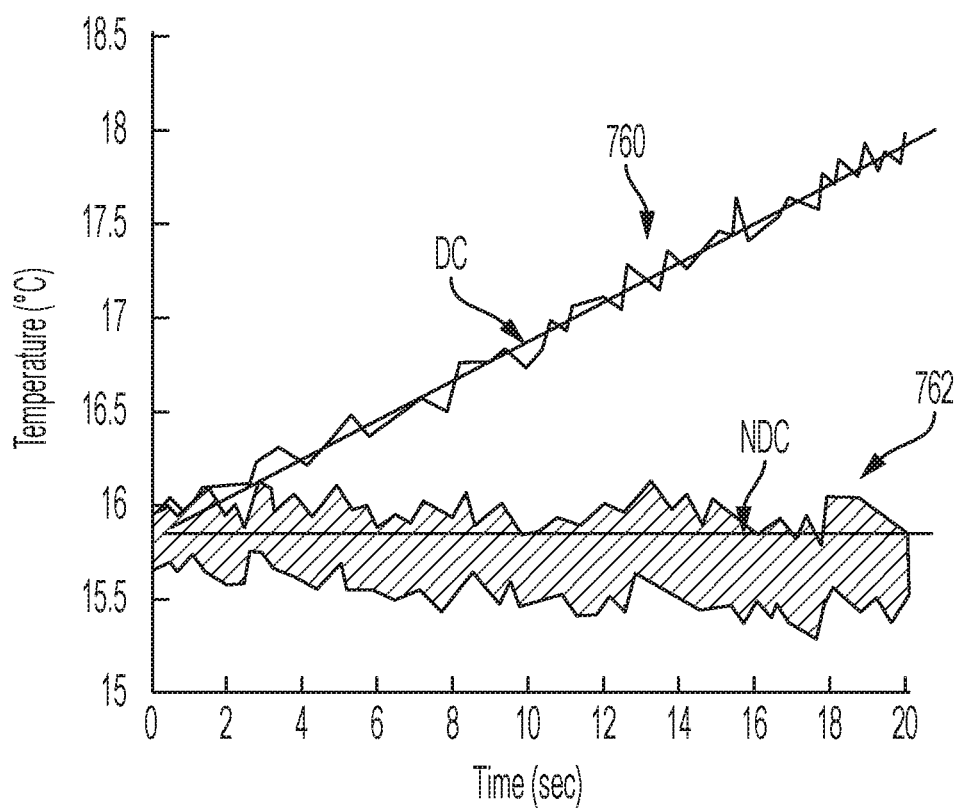
FIG. 7 is a graph illustrating an example temperature response of channels in a plugged honeycomb body in accordance with an embodiment.

The temperature responses of defective channels and a plurality of non-defective channels (shown as an aggregate range of values) are plotted and shown in FIG. 7. The graph illustrates the change in temperature over time of both the defective channel and the aggregated plurality of non-defective channels. A first response 760 of a defective channel generally defines a line DC having a slope. Similarly, a second response 762 of the non-defective channels also defines a line NDC having a second slope. The second response 762 also corresponds to and/or defines a temperature range (e.g., between about 15.5° C. and 16° C. in this example). The slopes of lines DC, NDC represent the temperature gradient of each of the channels over a duration of time. Similarly, the temperature difference between the channels (e.g., between the defect-containing channel corresponding to the first response 760 and the defect free channels included in the second response 762) at each given time interval can be used to create a spatial gradient over the face of the honeycomb body. As shown, the slope of line DC corresponding to the defective channel is significantly greater than the slope of line NDC corresponding to the non-defective channel, and that difference in slope becomes apparent consistently within the first 10 seconds, and even in the first 3-5 seconds, of collecting thermal data. Similarly, the difference between the temperature values of the defect-containing channel response 760 and defect-free channel response 762 becomes sufficiently (i.e., measurably) large within about 5 seconds in this example (e.g., greater than about 0.2° C.). The duration of time selected for the inspection is selected to capture a measurable difference in slope between defective channels and non-defective channels, while avoiding drying the pore impediment out of the plugged honeycomb body 100 which may render the pore impediment less effective.

Figure 8:
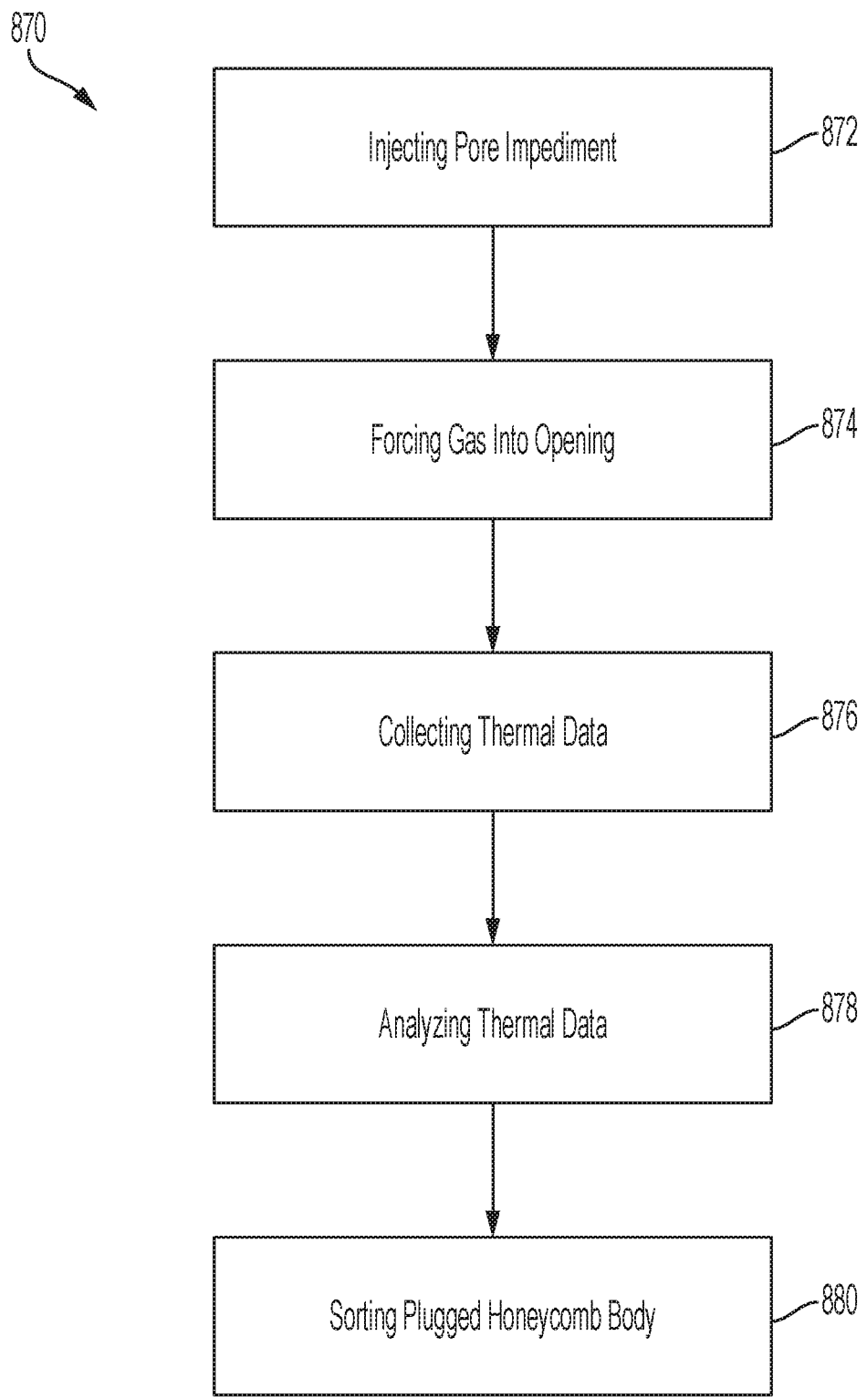
FIG. 8 depicts a flowchart of an example method of detecting leaks in a plugged honeycomb body in accordance with an embodiment.

FIG. 8 depicts a flowchart 870 of an example method of detecting leaks in a plugged honeycomb body. Flowchart 870 can be performed using the test gas supply apparatus 420 shown in FIG. 4. Further structural and operational embodiments will be apparent to persons skilled in the relevant art(s) based on the discussion regarding the flowchart 870.

As shown in FIG. 8, the method of flowchart 870 begins at step 872. In step 872, pore impediment is injected into a plugged honeycomb body (e.g., the plugged honeycomb body 100). In an example embodiment, injecting a pore impediment at step 872 comprises injecting a pore impediment using the impediment injector (e.g., the impediment injector 300) to wet the inner walls (e.g., the inner walls 106) of the plugged honeycomb body with the pore impediment. In some embodiments, wetting the inner walls comprises injecting droplets of the pore impediment so that the droplets enter and at least partially block the pores (e.g., the pores 522) of the inner walls. The plugged honeycomb body can be loaded into a holder (e.g., the holder 310) that supports the plugged honeycomb body and creates a seal, e.g., using a bladder or seal member. In some embodiments, the step 872 comprises injecting the pore impediment until the plugged honeycomb body reaches a predetermined amount of saturation. The pore impediment can be a liquid formed into suspended droplets, and the droplets can have a size (e.g., mean diameter) smaller than that of the mean pore size of the pores of the walls of the honeycomb body. In some embodiments, the size of the droplets is in a range between 5-80% of the mean pore size of pores. In an example embodiment, the pore impediment is nebulized, atomized, or sprayed water.

At step 874, a test gas (e.g., the test gas TG) is forced (e.g., flowed under pressure) into one or more open channels (e.g., the channel 114) at a first end (e.g., the end 108) in the plugged honeycomb body. The step 874 can comprise loading the plugged honeycomb body into a holder (e.g., the holder 432) that supports the plugged honeycomb body and/or creates a seal, e.g., using a bladder. In an example embodiment, the step 874 comprises forcing the test gas uniformly against the entire first end of the plugged honeycomb body. When the test gas is initially directed toward the plugged honeycomb body, there is a temperature difference between the test gas and the plugged honeycomb body. In an example embodiment, that temperature difference is at least 0.2° C. In another example embodiment, the temperature difference is at least 10° C. In an example embodiment, the test gas is heated in a gas supply apparatus (e.g., the gas supply apparatus 420) to a temperature that is higher than the temperature of the plugged honeycomb body. In other embodiments, the test gas is cooled, e.g., via a refrigeration device, to a temperature less than that of the honeycomb body. In other embodiments, the honeycomb body can be either heated or cooled. In some embodiments, at least one of the first temperature of the honeycomb body and the second temperature of the test gas is room or ambient temperature.

At step 876, thermal data is collected. In an example embodiment, collecting thermal data in step 876 comprises collecting thermal data from an inspection region (e.g., the inspection region 542) using a thermal detector (e.g., the thermal detector 434). The thermal detector 434 has a detection axis directed toward the inspection region and collects thermal data (e.g., measures the temperature at the inspection region and/or a parameter representative of the temperature such as infrared radiation). In an example embodiment, the inspection region is a portion of a wall of the plugged honeycomb body adjacent an end of a channel (e.g., the channel 116) that is open on the second end (e.g., the end 110) of the plugged honeycomb body. The thermal detector can be aligned by directing the detection axis toward the inspection region to form an angle θ between the detection axis D and the longitudinal axis L of the second channel that is in a range between 1-90°. In an example embodiment, the thermal detector is used to collect thermal data with a frequency of multiple times per second. In an example embodiment, the frequency is greater than 20 measurements per second. For instance, the frequency can be in a range between 30-60 measurements per second. In an example embodiment, the thermal detector is a thermal imaging camera that collects temperature readings of the inspection region.

Collecting the thermal data can comprise collecting a plurality of subsets of thermal data a plurality of times over a duration of time. As an example, at least one subset can be collected prior to forcing test gas TG into openings of the plugged honeycomb body 100. In an example embodiment, the duration of time is less than 10 seconds. For instance, the duration of time can be between 2-6 seconds.

As described above, the temperature response (e.g., the temperature response 760 and 762) of the plugged honeycomb body 100 at the second end 110 can be analyzed to identify defects in the inner walls 106 of the plugged honeycomb body 100. The thermal data can comprise pixel data that correlates to the temperature of a portion of the plugged honeycomb body 100 that corresponds to the pixels. That pixel data can be used to identify regions of the plugged honeycomb body 100 that require analysis to determine whether a defect in an inner wall 106 is present.

At step 878, the thermal data is analyzed. Analyzing the thermal data in step 878 can comprise analyzing the thermal data by calculating gradient data related to a temperature change over time or space of one or more of the inspection regions. The gradient data can be compared to a gradient threshold to determine portions of the plugged honeycomb body that include a defect. For example, and as shown in the graph of FIG. 7, a defect channel can be determined as any channel having a positive temperature gradient in a first initial time period, e.g., the first 2-6 seconds of flow of the test gas TG and/or by temperature values or differences in temperature values that exceed a certain threshold (e.g., channels having a temperature that differs from a baseline temperature by greater than about 0.2° C.). A non-defect cell can be determined as those channels having a temperature gradient of zero, close to zero, or less than a predetermined slope during that same time period. As discussed above, a sufficiently positive gradient indicates that the test gas TG is able to "short-circuit" through the defects in the porous walls without being impeded by the pore impediment and into the outlet channel, resulting in a temperature difference at the inspection region in comparison to defect-free channels. A temperature gradient closer to zero generally indicates that the test gas TG does not have a "short-circuit" and is thereby sufficiently blocked by the pore impediment so that the temperature of the inspection region is not as significantly affected by the flow of the test gas, particularly in the time period shortly after the flow of test gas is started, e.g., the first several seconds. As an example, the gradient threshold can be selected so that any pixel demonstrating a temperature gradient of greater than or equal to 0.1° C./sec indicates a defect.

The analysis of step 878 can also utilize a comparison between temperature gradients of adjacent inspection regions, and identifying requiring a plurality of adjacent inspection regions to display a temperature gradient above a threshold for a defect to be identified. Still further, a selected number of adjacent pixels displaying a temperature gradient above the threshold can be required to identify a portion of the plugged honeycomb body 100 as including a defect. In an example embodiment, a defect can be identified when a number of pixels superimposed on the plugged honeycomb body 100 displaying a temperature gradient (either with respect to time or space) above the threshold corresponds to the physical size of a channel 112, such as a number of pixels corresponding to 10-100% of the size of an opening of the channel 112. In an example embodiment, a defect can be identified when a number of pixels displaying a temperature gradient above the threshold are detected within a selected area, such as in 10 pixels within a 5 mm radius of each other. In an example embodiment, a number of pixels over the entire plugged honeycomb body 100 displaying a temperature gradient above the threshold can be used as a threshold, such as 100 pixels, or 200 pixels.

The method can also comprise applying additional techniques to increase the certainty in the identification of defects. For example, the method can utilize a region of interest analysis, flattening analysis, thresholding analysis, blob analysis, and noise filters. For example, after a trigger pixel demonstrates a measurement that exceeds a threshold, the system can focus on a region of the plugged honeycomb body, such as within a predetermined radius, to take further measurements. A system algorithm can be applied that focuses on identifying channels that have severe temperature change compared to adjacent channels.

A flattening analysis can also be used to provide additional resolution to the images created by the system. The system can apply an algorithm that creates a linear temperature model to all the pixels that separates gradient and constant coefficients from a series of thermal images taken over time. The gradient and constant coefficients are initially derived from the first two images and iteratively updated with sequential thermal images by using a gradient descent method. The gradient temperature is flattened using spatial image filters (e.g., mean filter and guide filter). As an example, a baseline image of the plugged honeycomb body 100 can be used to normalize the temperatures across the plugged honeycomb body 100. In an example embodiment, the baseline image is created by collecting thermal data from the plugged honeycomb body 100 prior to forcing the test gas TG into the plugged honeycomb body 100. In some instances, the plugged honeycomb body 100 can not be at a completely uniform temperature so some of the channels in a portion of the plugged honeycomb body 100 can have different temperature than other portions prior to forcing the test gas TG into the plugged honeycomb body. That difference in temperature can cause blurriness in the thermal image. The baseline image is used to is flatten subsequent test images to provide higher contrast, effectively normalizing the steady state thermal image across all of the channels.

Thresholding analysis can also be used. When thresholding analysis is applied, thresholds for temperature and temperature gradient can be used to focus the analysis. As an example, after the test gas TG is forced into the plugged honeycomb body 100, a channel 112 can demonstrate a gradient that exceeds a predetermined threshold. Next the temperature of that channel 112 is measured and if the temperature of that channel 112 does not exceed a predetermined value, the channel is not considered defective. As an example, the system will not consider any channel having a temperature below a designated threshold, and does not just rely on the amount of change in the temperature if the temperature does not go above a designated temperature despite the gradient being high.

Blob analysis (e.g., Laplacian of Gaussian and Difference of Gaussian) involves analyzing gradient data for pixels surrounding a pixel that demonstrates a gradient that is greater than or equal to a gradient threshold. Many pixels can be superimposed on a single channel 112, so in a defective channel 112 a group of pixels will demonstrate a gradient that exceeds the threshold. The system will consider groupings of pixels surrounding the trigger pixels because if only the trigger pixel is above the gradient, then it is likely noise, and the trigger pixel can be disregarded. Other techniques for performing blob analysis can be applied.

Noise filters can be applied to determine whether a pixel is accurately indicative of a defective channel or whether the pixel is noise. Generally, a rise in temperature of a defective channel 112 will last over multiple data collection samples. The system can apply noise filters to consider whether a pixel demonstrates gradient meeting the threshold over a sufficient number of periods to avoid false positives. In an embodiment, the thermal detector collects thermal data at a frequency of 60 Hz, so if a measurement pixel exceeds gradient but for only a couple samples, for example if the high gradient lasts only $\frac{3}{60}^{th}$ of a second or less, it may not indicate a real defect. In an example, the system will only consider measurements above the threshold that last for greater than 2 seconds to be indicative of a defect.

Further analysis can be performed based on data from defective channels 112. For example, analysis can be included of the value of the gradient through the duration of inspection, the rate of change of the gradient (i.e., the slope of the gradient), and/or size of pixel cluster can be used to analyze the size and/or type of defect.

At step 880, the plugged honeycomb body is sorted. Sorting the plugged honeycomb body in step 880 comprises using the analysis to sort a plugged honeycomb body. In an example, sorting a plugged honeycomb body 100 comprises designating a plugged honeycomb body as passing or failing the inspection. As a further example, the thermal gas inspection can be included in a manufacturing environment to provide in-line testing of plugged honeycomb bodies 100. The test results can be used to sort the plugged honeycomb bodies 100 as passed, failed to be repaired, or failed to be scrapped. In an example embodiment, when a plugged honeycomb body 100 is determined to have at least a threshold number of identified defects, the plugged honeycomb body 100 can be marked as a failed part. That failed part can be removed at the end of the production line by an operator or sorted by a material handler, such as a robot, to a reject conveyor. In an example embodiment, the thermal gas test results are recorded in a data base and correlated to a machine-readable code (e.g., barcode) as a "part failed" or "passed." Still further, the part can be marked with at least one indicium identifying the part as a passed or failed part, based on the thermal gas test results.

III. Further Discussion of Some Example Embodiments

A first example apparatus to detect leaks in a plugged honeycomb body having a plurality of intersecting porous walls defining a first channel open at a first end of the honeycomb body and plugged at a second end opposite to the first end, and a second channel open at the second end and plugged at the first end comprises a pore impediment injector, a gas supply, a thermal detector, and one or more processors. The pore impediment injector is configured to inject a pore impediment into a plurality of pores of the intersecting porous walls of the plugged honeycomb body. The pore impediment has an impediment size that is smaller than a mean pore size of the plurality of pores. The gas supply is configured to force gas into an opening of the first channel at the first end of the plugged honeycomb body. The plugged honeycomb body is at a first temperature and the gas is at a second temperature that is different from the first temperature. The thermal detector is configured to collect thermal data from an inspection region of the second channel at the second end of the plugged honeycomb body. The one or more processors are configured to calculate gradient data related to at least one of a temperature change over time or a temperature difference over space from the thermal data.

In a first aspect of the first example apparatus, the thermal detector defines a detection axis, the second channel defines a longitudinal axis, and an angle between the detection axis and the longitudinal axis of the second channel is in a range between 1° and 90°.

In a second aspect of the first example apparatus, the first example apparatus further comprises a display configured to provide a visual representation of the gradient data. The second aspect of the first example apparatus can be implemented in combination with the first aspect of the first example apparatus, though the example embodiments are not limited in this respect.

In a third aspect of the first example apparatus, the one or more processors are configured to compare the gradient data and a predetermined gradient threshold and to provide output data correlating to the comparison. The third aspect of the first example apparatus can be implemented in combination with the first and/or second aspect of the first example apparatus, though the example embodiments are not limited in this respect.

In a fourth aspect of the first example apparatus, the gas is at least one of air, nitrogen, hydrogen, or helium, and the gas has a relative humidity in a range between 2-40%. The fourth aspect of the first example apparatus can be implemented in combination with the first, second, and/or third aspect of the first example apparatus, though the example embodiments are not limited in this respect.

In a fifth aspect of the first example apparatus, the second temperature is different from the first temperature by at least 0.2° C. The fifth aspect of the first example apparatus can be implemented in combination with the first, second, third, and/or fourth aspect of the first example apparatus, though the example embodiments are not limited in this respect.

In an implementation of the fifth aspect of the first example apparatus, the second temperature is different from the first temperature by at least 1° C.

In a sixth aspect of the first example apparatus, the pore impediment is at least one of nebulized, atomized, or sprayed liquid. The sixth aspect of the first example apparatus can be implemented in combination with the first, second, third, fourth, and/or fifth aspect of the first example apparatus, though the example embodiments are not limited in this respect.

In a seventh aspect of the first example apparatus, the thermal detector is a thermal imaging camera. The seventh aspect of the first example apparatus can be implemented in combination with the first, second, third, fourth, fifth and/or sixth aspect of the first example apparatus, though the example embodiments are not limited in this respect.

In an eighth aspect of the first example apparatus, the first example apparatus further comprises a holder that supports the plugged honeycomb body. The eighth aspect of the first example apparatus can be implemented in combination with the first, second, third, fourth, fifth, sixth and/or seventh aspect of the first example apparatus, though the example embodiments are not limited in this respect.

In a ninth aspect of the first example apparatus, the impediment size is in a range between 5-80% of the mean pore size of the plurality of pores. The ninth aspect of the first example apparatus can be implemented in combination with the first, second, third, fourth, fifth, sixth, seventh and/or eighth aspect of the first example apparatus, though the example embodiments are not limited in this respect.

In a tenth aspect of the first example apparatus, the inspection region of the second channel is disposed on at least one wall of the plugged honeycomb body adjacent an opening of the second channel. The tenth aspect of the first example apparatus can be implemented in combination with the first, second, third, fourth, fifth, sixth, seventh, eighth and/or ninth aspect of the first example apparatus, though the example embodiments are not limited in this respect.

A second example apparatus to detect leaks in a plugged honeycomb body having a plurality of intersecting porous walls defining a first channel open at a first end of the honeycomb body and plugged at a second end opposite to the first end, and a second channel open at the second end and plugged at the first end comprises a pore impediment injector, a gas supply, a thermal detector, and one or more processors. The pore impediment injector is configured to inject liquid that is provided as liquid droplets into a plurality of pores of the intersecting porous walls of the plugged honeycomb body. The liquid droplets are provided using at least one of nebulizing, atomizing, or spraying, and the liquid droplets have a mean droplet size that is smaller than a mean pore size of the plurality of pores. The gas supply is configured to force air into an opening of the first channel at the first end of the plugged honeycomb body. The plugged honeycomb body is at a first temperature and the air is at a second temperature that is different from the first temperature by at least 0.2° C. The thermal detector is configured to collect thermal data from an inspection region of the second channel at the second end of the plugged honeycomb body. The one or more processors are configured to calculate gradient data related to at least one of a temperature change over time or a temperature difference over space from the thermal data collected from the inspection region.

In a first aspect of the second example apparatus, the thermal detector defines a detection axis, wherein the second channel defines a longitudinal axis, and wherein an angle between the detection axis and the longitudinal axis of the second channel is in a range between 1° and 90°.

In a second aspect of the second example apparatus, the second example apparatus further comprises a display configured to provide a visual representation of the gradient data. The second aspect of the second example apparatus can be implemented in combination with the first aspect of the second example apparatus, though the example embodiments are not limited in this respect. The third aspect of the second example apparatus can be implemented in combination with the first and/or second aspect of the second example apparatus, though the example embodiments are not limited in this respect.

In a fourth aspect of the second example apparatus, the mean droplet size is in a range between 5-80% of the mean pore size of the plurality of pores. The fourth aspect of the second example apparatus can be implemented in combination with the first, second and/or third aspect of the second example apparatus, though the example embodiments are not limited in this respect.

In a fifth aspect of the second example apparatus, the inspection region of the second channel is disposed on at least one wall of the plugged honeycomb body adjacent an opening of the second channel. The fifth aspect of the second example apparatus can be implemented in combination with the first, second, third and/or fourth aspect of the second example apparatus, though the example embodiments are not limited in this respect.

An example method of detecting leaks in a plugged honeycomb body having a plurality of intersecting porous walls defining a first channel open at a first end of the honeycomb body and plugged at a second end opposite to the first end, and a second channel open at the second end and plugged at the first end comprises injecting a pore impediment, forcing gas into an opening of a first channel defined by the plugged honeycomb body, collecting thermal data, and analyzing the thermal data. The pore impediment is injected into a plurality of pores of the intersecting porous walls of the plugged honeycomb body. The pore impediment has an impediment size that is smaller than a mean pore size of the plurality of pores. The plugged honeycomb body is at a first temperature and the gas is at a second temperature that is different from the first temperature. The thermal data is collected from an inspection region of the second channel at the second end of the plugged honeycomb body using a thermal detector. The thermal data is analyzed to calculate gradient data related to at least one of a temperature change over time or a temperature difference over space of the inspection region to determine whether the plugged honeycomb body has one or more defects.

In a first aspect of the example method, the thermal detector is a thermal imaging camera. In further accordance with the example method, the example method further comprises relating a physical dimension of the plugged honeycomb body and determining at least one of a size or a location of the identified one or more defects. Still further, determining at least one of a size or a location is based at least in part on the physical dimension of the plugged honeycomb body being correlated to a pixel of the thermal data.

In a second aspect of the example method, the example method further comprises loading the plugged honeycomb body onto a holder. The second aspect of the example method can be implemented in combination with the first aspect of the example method, though the example embodiments are not limited in this respect.

In a third aspect of the example method, analyzing the thermal data further comprises applying at least one of a flattening analysis, a blob analysis, or a noise filter to the thermal data. The third aspect of the example method can be implemented in combination with the first and/or second aspect of the example method, though the example embodiments are not limited in this respect.

In a fourth aspect of the example method, collecting the thermal data comprises collecting a plurality of subsets of the thermal data at a plurality of respective times over a duration of time, and wherein at least one of the subsets of the thermal data is collected prior to forcing the gas into the opening of the first channel. The fourth aspect of the example method can be implemented in combination with the first, second, and/or third aspect of the example method, though the example embodiments are not limited in this respect.

In an implementation of the fourth aspect of the example method, the duration of time is less than 10 seconds.

In an example of the first implementation, the duration of time is in a range between 2 and 6 seconds.

In a fifth aspect of the example method, the pore impediment is at least one of nebulized, atomized, or sprayed liquid. The fifth aspect of the example method can be implemented in combination with the first, second, third, and/or fourth aspect of the example method, though the example embodiments are not limited in this respect.

In a sixth aspect of the example method, the example method further comprising aligning the thermal detector by directing a detection axis of the thermal detector toward the inspection region of the plugged honeycomb body so that an angle between the detection axis and a longitudinal axis of the second channel is in a range between 1° and 90°. The sixth aspect of the example method can be implemented in combination with the first, second, third, fourth, and/or fifth aspect of the example method, though the example embodiments are not limited in this respect.

In a seventh aspect of the example method, analyzing the thermal data comprises comparing first gradient data for a first inspection region and second gradient data for a second inspection region. In further accordance with the seventh aspect, the first inspection region and the second inspection region are disposed at adjacent channels. The seventh aspect of the example method can be implemented in combination with the first, second, third, fourth, fifth and/or sixth aspect of the example method, though the example embodiments are not limited in this respect.

In an eighth aspect of the example method, analyzing the thermal data comprises comparing the gradient data and a predetermined gradient threshold and providing output data correlating to the comparison. The eighth aspect of the example method can be implemented in combination with the first, second, third, fourth, fifth, sixth and/or seventh aspect of the example method, though the example embodiments are not limited in this respect.

In a first implementation of the eighth aspect of the example method, the predetermined gradient threshold is a number of adjacent pixels superimposed over the plugged honeycomb body having a gradient value greater than a predetermined gradient value.

In a second implementation of the eighth aspect of the example method, the predetermined gradient threshold is a number of pixels superimposed over the plugged honeycomb body located within a predetermined radius having a gradient value greater than a predetermined gradient value.

In a third implementation of the eighth aspect of the example method, the predetermined gradient threshold is a number of pixels superimposed over the plugged honeycomb body having a gradient value greater than a predetermined gradient value.

In a fourth implementation of the eighth aspect of the example method, the predetermined gradient threshold is a proportion of total pixels superimposed on the plugged honeycomb body having a gradient value greater than a predetermined gradient value.

In an example of the fourth implementation, the proportion of total pixels is in a range of 10%-100% of the total pixel count of an open channel for that honeycomb body.

In a ninth aspect of the example method, the impediment size is in a range between 5-80% of a mean pore size of the plurality of pores. The ninth aspect of the example method can be implemented in combination with the first, second, third, fourth, fifth, sixth, seventh and/or eighth aspect of the example method, though the example embodiments are not limited in this respect.

In a tenth aspect of the example method, the second temperature is different from the first temperature by at least 0.2° C. The tenth aspect of the example method can be implemented in combination with the first, second, third, fourth, fifth, sixth, seventh, eighth and/or ninth aspect of the example method, though the example embodiments are not limited in this respect.

In an eleventh aspect of the example method, the inspection region of the second channel is disposed on at least one wall of the plugged honeycomb body adjacent an opening of the second channel. The eleventh aspect of the example method can be implemented in combination with the first, second, third, fourth, fifth, sixth, seventh, eighth, ninth and/or tenth aspect of the example method, though the example embodiments are not limited in this respect.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An apparatus to detect leaks in a plugged honeycomb body having a plurality of intersecting porous walls defining a first channel open at a first end of the honeycomb body and plugged at a second end opposite to the first end, and a second channel open at the second end and plugged at the first end, the apparatus comprising:
    a pore impediment injector configured to inject a pore impediment into a plurality of pores of the intersecting porous walls of the plugged honeycomb body, the pore impediment having an impediment size that is smaller than a mean pore size of the plurality of pores;
    a gas conditioning device configured to adjust a temperature of a gas to a second temperature;
    a gas supply configured to force gas from the gas conditioning device into an opening of the first channel at the first end of the plugged honeycomb body, the plugged honeycomb body being at a first temperature that is different from the second temperature of the gas being forced into the opening of the first channel at the first end of the honeycomb body by the gas supply;
    a thermal detector configured to collect thermal data from an inspection region of the second channel at the second end of the plugged honeycomb body; and
    one or more processors configured to calculate gradient data related to at least one of a temperature change over time or a temperature difference over space from the thermal data.

2. The apparatus of claim 1, wherein the thermal detector defines a detection axis, wherein the second channel defines a longitudinal axis, and wherein an angle between the detection axis and the longitudinal axis of the second channel is in a range between 1° and 90°.

3. The apparatus of claim 1, wherein the one or more processors are configured to compare the gradient data and a predetermined gradient threshold and to provide output data correlating to the comparison.

4. The apparatus of claim 1, wherein the gas is at least one of air, nitrogen, hydrogen, or helium, and wherein the gas has a relative humidity in a range between 2-40%.

5. The apparatus of claim 1, wherein the pore impediment is at least one of nebulized, atomized, or sprayed liquid.

6. The apparatus of claim 1, wherein the impediment size is in a range between 5-80% of the mean pore size of the plurality of pores.

7. A method of detecting leaks in a plugged honeycomb body having a plurality of intersecting porous walls defining a first channel open at a first end of the honeycomb body and plugged at a second end opposite to the first end, and a second channel open at the second end and plugged at the first end, the method comprising:
    injecting a pore impediment into a plurality of pores of the intersecting porous walls of the plugged honeycomb body, the pore impediment having an impediment size that is smaller than a mean pore size of the plurality of pores;

forcing gas into an opening of the first channel defined by the plugged honeycomb body, the plugged honeycomb body being at a first temperature and the gas being at a second temperature that is different from the first temperature;

collecting thermal data from an inspection region of the second channel at the second end of the plugged honeycomb body using a thermal detector; and analyzing the thermal data to calculate gradient data related to at least one of a temperature change over time or a temperature difference over space of the inspection region to determine whether the plugged honeycomb body has one or more defects.

8. The method of claim 7, wherein the thermal detector is a thermal imaging camera, and wherein the method further comprises:

relating a physical dimension of the plugged honeycomb body; and determining at least one of a size or a location of the identified one or more defects based at least in part on the physical dimension of the plugged honeycomb body being correlated to a pixel of the thermal data.

9. The method of claim 7, wherein collecting the thermal data comprises collecting a plurality of subsets of the thermal data at a plurality of respective times over a duration of time, and wherein at least one of the subsets of the thermal data is collected prior to forcing the gas into the opening of the first channel.

10. The method of claim 7, wherein the pore impediment is at least one of nebulized, atomized, or sprayed liquid.

11. The method of claim 7, wherein analyzing the thermal data comprises comparing first gradient data for a first inspection region and second gradient data for a second inspection region, wherein the first inspection region and the second inspection region are disposed at adjacent channels.

12. The method of claim 7, wherein analyzing the thermal data comprises comparing the gradient data and a predetermined gradient threshold and providing output data correlating to the comparison.

13. The method of claim 12, wherein the predetermined gradient threshold is a number of adjacent pixels superimposed over the plugged honeycomb body having a gradient value greater than a predetermined gradient value.

14. The method of claim 12, wherein the predetermined gradient threshold is a number of pixels superimposed over the plugged honeycomb body located within a predetermined radius having a gradient value greater than a predetermined gradient value.

15. The method of claim 12, wherein the predetermined gradient threshold is a number of pixels superimposed over the plugged honeycomb body having a gradient value greater than a predetermined gradient value.

16. The method of claim 12, wherein the predetermined gradient threshold is a proportion of total pixels superimposed on the plugged honeycomb body having a gradient value greater than a predetermined gradient value.

17. The method of claim 16, wherein the proportion of total pixels is in a range of 10%-100% of the total pixel count of an open channel for that honeycomb body.

18. The method of claim 7, wherein the impediment size is in a range between 5-80% of a mean pore size of the plurality of pores.

19. The method of claim 7, wherein the inspection region of the second channel is disposed on at least one wall of the plugged honeycomb body adjacent an opening of the second channel.

20. The method of claim 7, further comprising sorting the plugged honeycomb body based on the determination of whether the plugged honeycomb body has one or more defects.

* * * * *